United States Patent [19]

Celik

[11] Patent Number: 4,769,573
[45] Date of Patent: Sep. 6, 1988

[54] TAPE CASSETTE DISPENSER

[76] Inventor: Michael Celik, P.O. Box 83, Downsview, Ontario, Canada, M3M 2Z9

[21] Appl. No.: 67,973

[22] Filed: Jun. 30, 1987

[51] Int. Cl.⁴ ............................................. A47F 1/04
[52] U.S. Cl. ........................................ 312/60; 312/9; 312/42
[58] Field of Search ...................... 312/42, 50, 60, 61, 312/9, 10, 114

[56] References Cited

U.S. PATENT DOCUMENTS

| | | | |
|---|---|---|---|
| 1,156,140 | 10/1915 | Hair | 312/42 |
| 1,734,031 | 11/1929 | Carlson | 312/42 |
| 2,295,313 | 9/1942 | Weir | 312/42 |
| 2,562,180 | 7/1951 | Foley et al. | 312/42 |
| 3,235,318 | 2/1966 | Rosenberg | 312/42 |
| 4,037,756 | 7/1977 | Jaquish | 312/42 |
| 4,132,329 | 1/1979 | Harrison | 312/60 |
| 4,255,001 | 3/1981 | Frishman | 312/114 |
| 4,317,603 | 3/1982 | Pepicelli et al. | 312/9 |

Primary Examiner—Victor N. Sakran

[57] ABSTRACT

The present invention provides a tape cassette storage and dispensing unit with a transparent chute feeding down to a support tray and having a lower front edge terminating above the tray with recessed regions to either side of the chute at the lower front edge to provide a finger access for gripping and removing the cassettes from the unit.

4 Claims, 2 Drawing Sheets

TAPE CASSETTE DISPENSER

FIELD OF THE INVENTION

The present invention relates to a storage and dispensing unit specifically designed for use with tape cassettes.

BACKGROUND OF THE INVENTION

Over the last few years the use of tape cassettes has become more and more popular to the extent that many people will have a very substantial collection of cassettes with taped music. There are presently available many different types of cassette storage units including the vertical stacking type in which the cassettes simply drop down into a storage chute. The problem with this type of unit is that there is no way of determining the location of a particular cassette without individually removing the cassettes from the top of the unit until finding the desired cassette.

SUMMARY OF THE PRESENT INVENTION

The present invention provides a unit for tape cassettes with both storage and dispensing capacity designed to overcome the problems discussed above. More particularly, the tape cassette storage and dispensing unit of the present invention has a transparent chute enabling viewing of all of the cassettes to locate a particularly desired cassette with the chute feeding down to a support tray. The chute itself has a lower front edge terminating above the tray to provide a dispensing opening and further has recessed side wall regions extending rearwardly from the lower front edge at both sides of the chute to provide a finger access for gripping and removing the bottom positioned cassette through the dispensing opening.

When working with the storage and dispensing unit of the present invention, one simply has to remove the cassettes from the bottom of the chute and refit them back into the top of the chute until reaching the desired cassette which as described above as clearly visible through the transparent chute.

BRIEF DESCRIPTION OF THE DRAWINGS

The above as well as other advantages and features of the present invention will be described in greater detail according to the preferred embodiments of the present invention in which.

DETAILED DESCRIPTION ACCORDING TO THE PREFERRED EMBODIMENT OF THE PRESENT INVENTION

Figure 1:
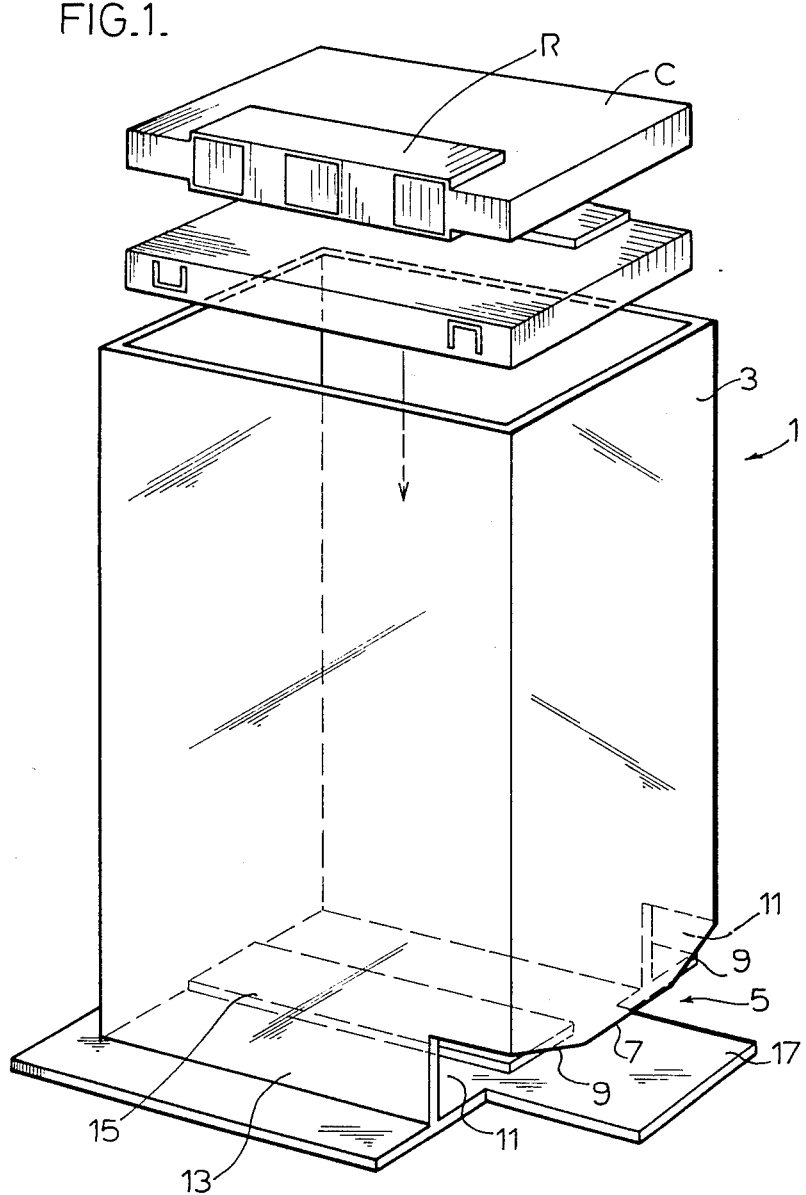
FIG. 1 is a perspective view of a tape cassette storage and dispensing unit according to a preferred embodiment of the present invention.
Figure 2:
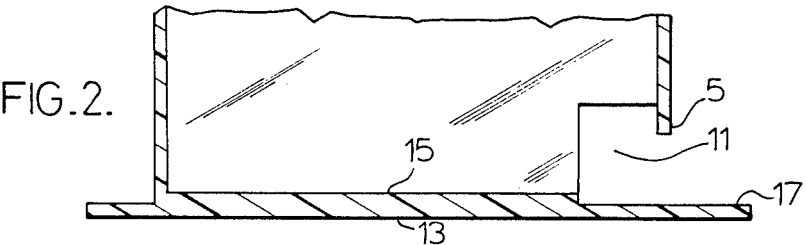
FIG. 2 is a bottom side sectional view of the unit shown in FIG. 1.

FIG. 1 shows a tape cassette storage and dispensing unit generally indicated at 1. This unit includes a chute 3 feeding down to a bottom positioned support tray 13. The chute itself is transparent so that each of the tapes regardless of their position can be seen in the chute.

Figure 3:
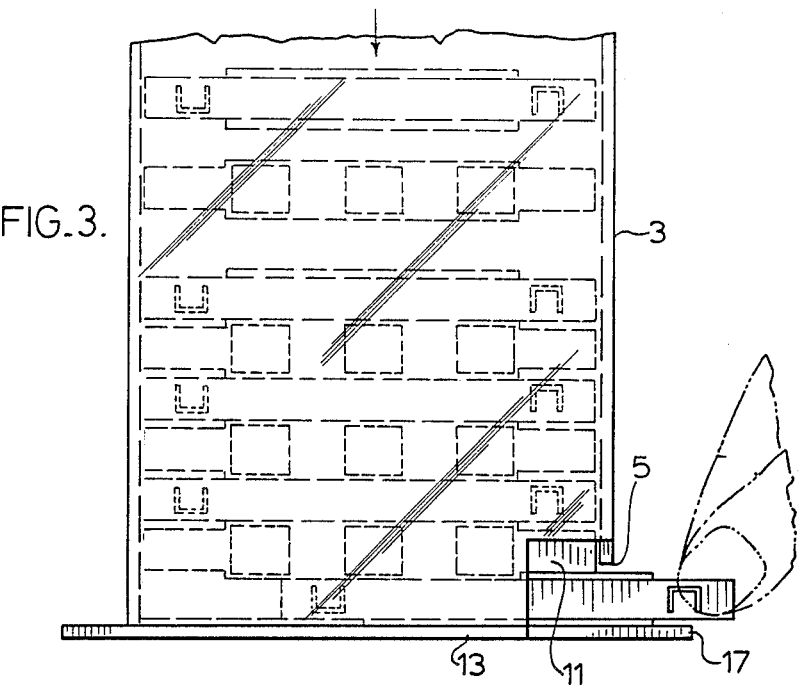
FIG. 3 is a bottom side view showing use of the unit of FIG. 1.
Figure 4:
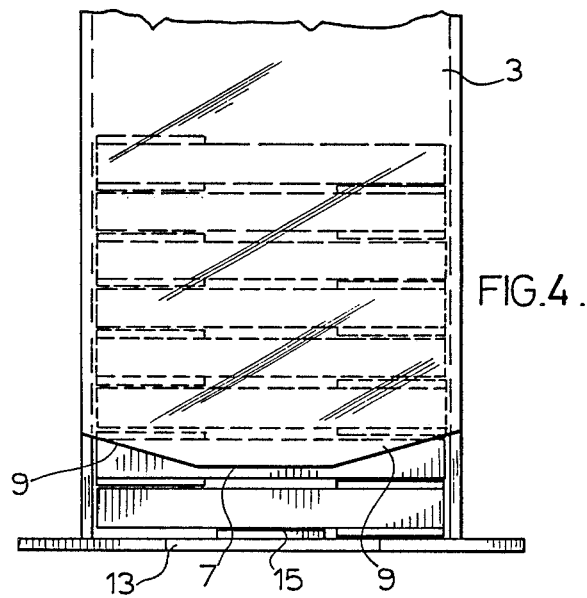
FIG. 4 is a front plan view of the unit of FIG. 1.

Provided at the lower front end of the unit is a dispensing opening for pulling the cassettes individually from the unit. This dispensing opening is defined by the lower front edge 5 of the chute and recessed regions 11 extending rearwardly into both sidewalls of the chute. The lower front edge of the front wall of the chute is formed with a center generally horizontally extending drop down region 7 and outer regions 9 to either side of and cut upwardly relative to the center region 7. This particular formation in combination with recessed regions 11 provides a very good finger grip access but limited to the bottom positioned cassette only best shown in FIGS. 3 and 4 of the drawings. Here it will be seen that one can easily grip the outer side edges of the bottom cassette by pinching in through recessed regions 11 with ample finger access being provided to the front of the unit past the upwardly cut outer front edge regions 9. However, the drop down center region 7 of the front edge, although positioned above the bottom cassette provides a clear blockage against the second lowermost cassette being pulled outwardly with the bottom positioned cassette. However once the bottom positioned cassette has been removed, the next cassette above it will automatically drop down to the bottom position.

To enhance the ease of use of the unit, the chute is left with a completely open upper end. With this arrangement one can quickly and easily pull out the bottom cassette until reaching the desired cassette the position of which is predetermined by viewing through the chute with each of the previously removed cassettes being quickly and easily replaced by dropping them through the open upper end of the chute. This provides a very simple and fast method of arriving at the desired cassette while replacing the non-desired cassettes back in the unit. The selection is made using one hand only leaving the other hand free making the unit particularly useful in an automobile where it does not distract the drivers attention. Furthermore, the unit is simple and compact so that it uses up very little space, again making it desirable for use in an automobile or any other limited space location.

As a further preferred feature the unit is designed for balancing of the cassettes where in FIG. 1 a cassette C is shown with a raised region R to one side of the cassette. this is standard cassette construction. To accomodate this construction, the lower support tray 13 is provided with its own raised region 15 generally centrally of the support tray. Accordingly, when the cassette at the bottom of the stack falls down onto support tray 13, rather than tipping to one side, because of raised region R on the cassette, it is balanced by means of raised region 15 on the support tray itself. This raised region is of substantially identical height to the raised region R on the cassette. Note that by positioning the raised region 15 centrally of support tray 13, it provides a counterbalance regardless of the orientation of the cassett itself, i.e. in either of the positions shown in FIG. 1 with raised region R to one side or the other of the chute. Also note that in FIG. 1 the cassettes are best balanced when in alternating positions with the raised region to one side of the chute and then to the other side of the chute between successive stacked cassettes.

Again, to enhance the removal of the cassettes from the unit the lower support tray is provided with a forwardly extending slide platform 17 extending completely through the dispensing opening. This slide tray provides a slide or slippery surface over which the cassette rides until it has been completely pulled out of the unit.

Not only is the cassette storage and dispensing unit low in cost and easy to manufacture, but in addition it is free of any moving parts ensuring consistent smooth operation without wear on either the cassettes or the unit itself.

It will now be seen from the description above how the tape cassette storage unit of the present invention which makes it easy to gather and store cassettes which might otherwise be loose and disorderly, additionally includes dispensing features with the ability to predetermine or preview the location of a particular desired cassette with quick and easy replacement of the non-desired cassettes back into the unit. Note that after a cassette is used and replaced in the unit, it will not move to the bottom of the stack without removing the cassettes below providing a long recycling period before hearing that particular cassette again rather than continuously listening to the same music.

Although various preferred embodiments of the invention have been described here in detail, it will be appreciated that variations may be made without departing from the spirit of the invention or the scope of the appended claims.

I claim:

1. A tape cassette storage and dispensing unit having a transparent chute feeding down to a support tray for seating a bottom positioned cassette in said chute, said support tray being provided with a centrally located raised cassette balance for balancing such bottom positioned cassette, said chute having a lower front edge terminating above said tray to provide a dispensing opening and further having recessed sidewall regions extending rearwardly from said lower front edge to either side of said chute to provide a finger access for gripping and removing the bottom positioned cassette through said dispensing opening.

2. A tape cassette storage and dispensing unit as claimed in claim 1 wherein said lower front edge of said chute is formed with a drop down central region and upwardly cut outer edge regions to either side of said chute adjacent said rearwardly recessed regions immediately above said support tray to enhance the finger access.

3. A tape cassette storage and dispensing unit as claimed in claim 1 wherein said chute includes an open upper end.

4. A tape cassette storage and dispensing unit as claimed in claim 1 including a slide platform extending outwardly from said support tray through said dispensing opening.

* * * * *